July 29, 1941. N. P. HARSHBERGER 2,250,482
SURFACE COVERING MATERIAL AND THE LIKE AND PROCESS OF MAKING SAME
Filed June 23, 1936 2 Sheets-Sheet 1
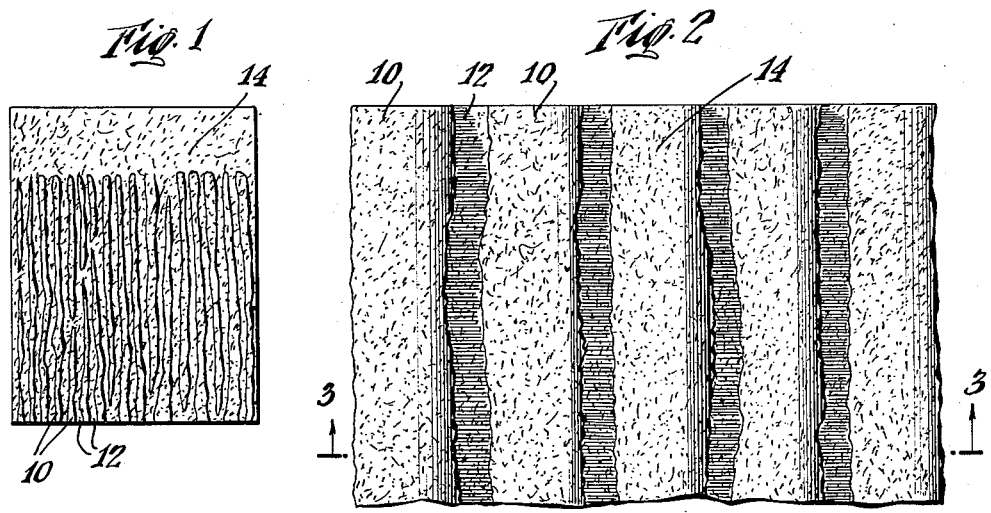
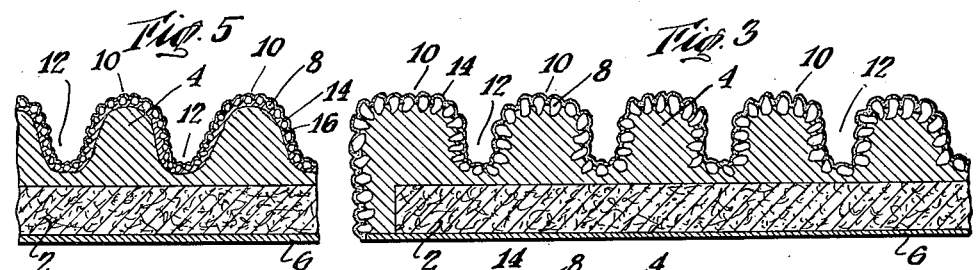
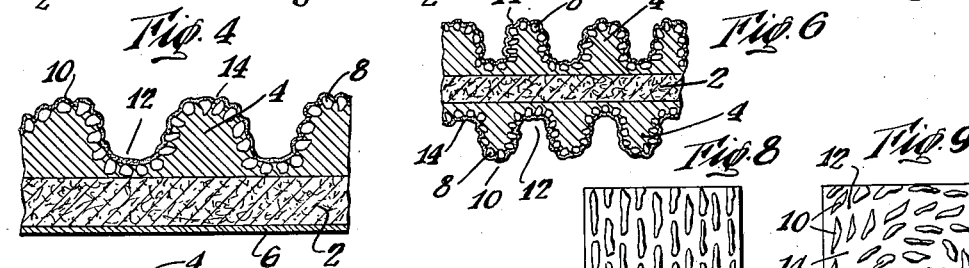
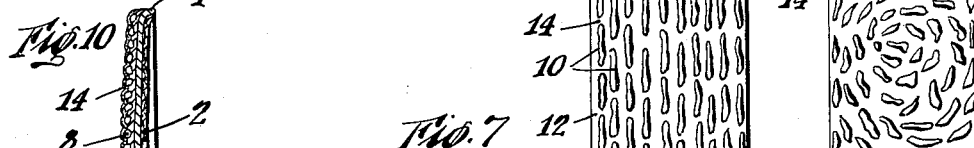
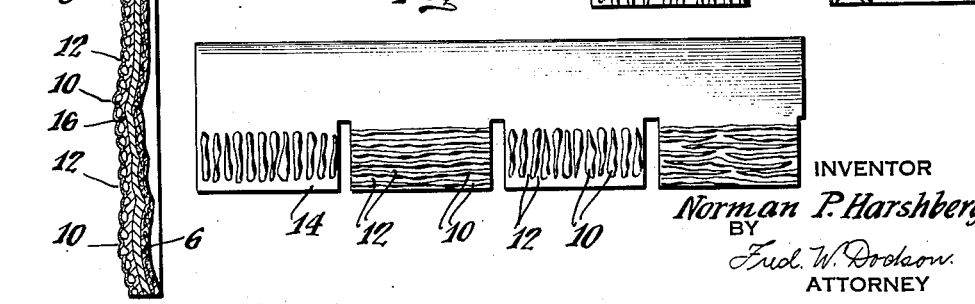
INVENTOR
Norman P. Harshberger
BY
Fred. W. Dodson
ATTORNEY July 29, 1941.   N. P. HARSHBERGER   2,250,482
SURFACE COVERING MATERIAL AND THE LIKE AND PROCESS OF MAKING SAME
Filed June 23, 1936   2 Sheets-Sheet 2
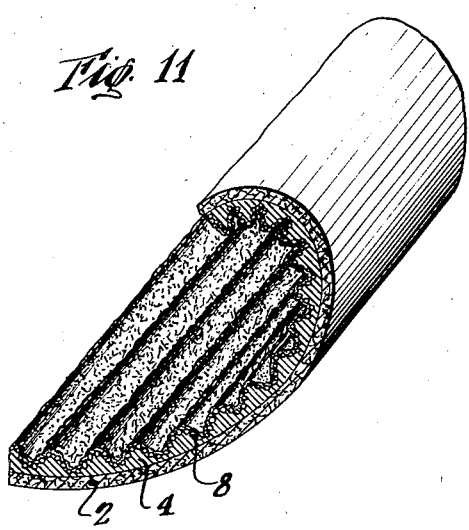
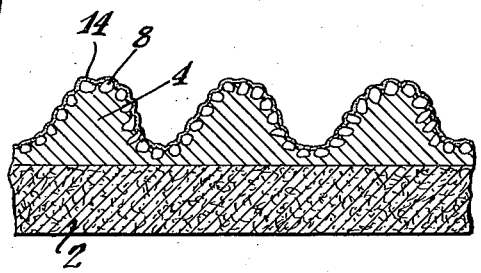
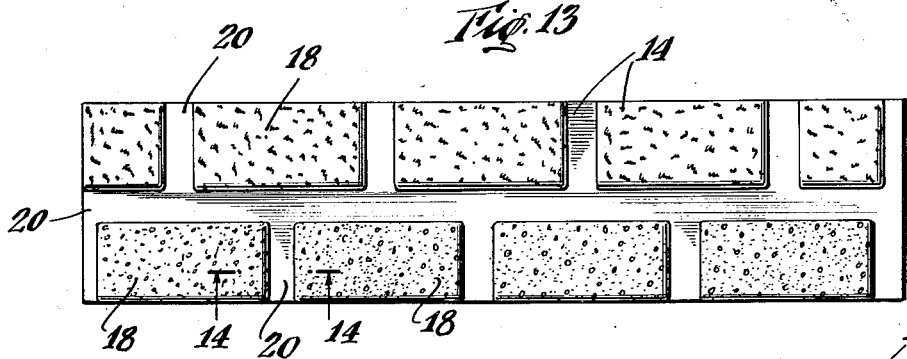
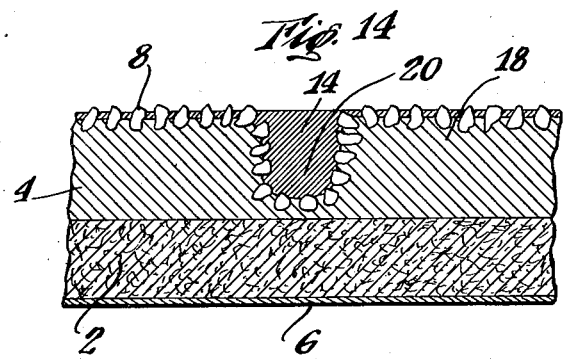
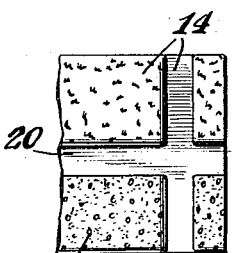
INVENTOR
Norman P. Harshberger
BY
Fred. W. Dodson
ATTORNEY Patented July 29, 1941

2,250,482

UNITED STATES PATENT OFFICE 2,250,482

SURFACE COVERING MATERIAL AND THE LIKE AND PROCESS OF MAKING SAME

Norman P. Harshberger, Scarsdale, N. Y., assignor, by mesne assignments, to Carbide and Carbon Chemicals Corporation, New York, N. Y., a corporation of New York Application June 23, 1936, Serial No. 86,877

11 Claims. (Cl. 91—68)

This invention relates to materials intended for exposure to weather or subject to wear and for that purpose provided with protective coatings or layers of suitable materials. Also, the invention has reference to materials of this character wherein one or more of the coatings or layers are arranged in formations to produce pleasing visual effects and physical improvements. Materials such as these find application, for instance, as coverings for roofs, walls, floors and the like. More particularly, the invention relates to fibrous based products intended for roofing and siding, for example, of the type of composition material described in my prior Patent No. 1,913,667, granted June 13, 1933, which material has been provided with one or more of the aforesaid characteristics, and the description which follows is therefore more specifically addressed to these embodiments.

Decorations in the form of raised and depressed body portions have been proposed for composition materials to eliminate the visual flatness of such material and to obtain shadow and heavy butt effects. Some forms of roofing have been made by operating upon the bitumen layer of the composition material as by embossing or corrugating to produce high and low areas in the bitumen layer, for instance in the form of ribs or ridges and valleys. Obviously, thick and thin areas of bitumen are created but it has been extremely difficult to subsequently attach a protective layer of colored grit, as it is impracticable to embed this material in the formed bituminous layer. Moreover, the bituminous material heretofore used lacks sufficient adhesiveness to properly grip granules such as slate, without their being embedded. Alternatively, it has been proposed to apply the granules first and subsequently operate upon the granules and bitumen. High and low areas of bitumen are produced but the granular material is unevenly impressed. In the low areas the granules are almost fully embedded and in certain instances are flush or completely covered by the bitumen in the bottom of the recesses. Also, the thin bituminous areas in the recesses are further weakened by the embedded granular material and the color effect of the granules in these areas has also been lost. In some instances the embedded granules have actually pierced the felt layer. The employment of exceedingly thick bituminous layers is expensive and the material tends to slip in warm climates. Also, visual effects produced by grit surfaced bitumen overlays provide certain advantages but the product may be bulky and requires special operations.

The foregoing constructions however, possess an inherent weakness in that the bitumen, at least between granules, is exposed to the elements and to the sunlight and is susceptible to rapid deterioration, for it is known that such exposure causes condensation or polymerization of the bitumen, resulting in hardening, with consequent checking or breaking down of this material, particularly where, as in many of the aforesaid prior constructions, relatively thin films or layers have been created by the operations performed upon the bitumen. Constant exposure to the elements causes this material to shrink and even crumble, and this, together with the absorption of moisture, causes deterioration of the whole product. Where laminations of bitumen exist, they are completely amalgamated or somewhat coalesced and in either case checking occurring in the uppermost surface extends itself into lower or apparent lower layers. Moreover, the bitumen of the usual composition roofing material possesses thermoplastic properties at low temperatures and when exposed in warm climates, softening, and flow occurs and the surface of the product is in this manner susceptible to further physical damage. Loss of bitumen, staining of the surface and more particularly, gradual disappearance of any raised formations readily occur. Also the asphalt is subject to blistering when exposed to the weather because of the presence of moisture and volatile materials which expand and are driven off at the elevated temperatures produced by the absorption of heat from the sun's rays.

It is therefore the general object of the invention to provide materials and structures in which the aforesaid undesirable effects may be substantially eliminated or reduced to a minimum and in which the finished product is a novel one possessing improved characteristics and other features not found in the prior materials.

Another object is the provision of roofing and siding material having surface effects, for example raised ribs and valleys simulating wood grain, formed by embossing or corrugating a plastic layer, and provided with a continuous top coating or layer of a wear and fire resistant substance which seals in the plastic understructure, enhances the simulations produced in the operations, and aids considerably in overcoming thermoplastic action if existent in the formed portions.

Other objects of the invention are the provision of a composition base material provided with the aforesaid surface coating or layer wherein this surface presents ribs and recesses created on a thermoplastic underlayer or one including a granular surfacing.

Further objects are the provision of the aforesaid structures wherein the surface formations comprise ribs separated by narrow and deep recesses; wherein the top coating or layer may be of substantial uniform thickness and follows the surface formation, or wherein the top coating or layer may be one comprising hydraulic cement of natural color and/or including coloring extending materials.

Additional objects include the formation of coated surface ribs of considerable length extending generally in the same direction; elongated surface ribs extending in series in rows with adjacent ribs in adjacent rows closely related and in staggered relation; or surface ribs which extend in all directions to produce a broken surface effect.

A further object is the provision of a roofing and siding strip having tab portions to be exposed, separated by narrow or wide slots, wherein at least the tab portions are formed with ribs or other raised surface effects and have a hydraulic cement surface layer following the surface formation of the formed undersurface structure.

Another object is to provide cement surfaced material formed with transverse ribs of triangular cross section; material possessing flexible characteristics when flexed parallel to the ribs and which may also be formed into curved or circular layers with the cement surfaced side forming the inner or outer face of the curve.

An additional object is the provision of a fibre base product having a bitumen layer formed with high and low surface effects such as ribs and valleys and having an overlying hardened film of liquid resinous material in which has been anchored a surface layer of grit, without being pressed.

A further object is the provision of a process and product involving the creation of figured effects, for example, brick siding, wherein a granular surfaced base with surface indentations emphasizing the configuration is surfaced with a coating material which coats the granules and substantially fills the indentations and wherein the coating on peak portions of the granules in the normal or raised portions has been removed to expose the surface color of said granules.

Another object is the provision of the previous structure in which the recesses extend into the portions of the material to be covered when assembled and in which the filling material comprises a substance, for example, a hydraulic cement that will give rigidifying characteristics to the product.

These and other objects will appear or be evident from the following description wherein details of construction and combinations of steps are given as to certain preferred exemplified embodiments. In this description and in the claims, certain specific terms, for example, roofing, ribs, ridges, etc. are used for convenience in referring to the various details. It is to be understood, however, that these terms are to be interpreted as including all equivalents and as broadly as the prior art will permit.

In the accompanying drawings, wherein similar reference characters represent similar parts, Fig. 1 is a plan view of a piece of material designed for use as a shingle embodying features of my invention;

Fig. 2 is an enlarged plan view of a section of material similar to that shown in Fig. 1;

Fig. 3 is an enlarged cross section taken at 3—3 of Fig. 2;

Fig. 4 is a cross sectional view illustrating the structure of Fig. 3 with the granular material in the valleys substantially flush with their binder;

Fig. 5 is a cross sectional view showing granules anchored in a hardened or set liquid layer;

Fig. 6 is a sectional view illustrating surface formations on both sides of a base;

Fig. 7 is a plan view of a strip of material formed with tabs embodying features of my invention;

Fig. 8 is a plan view showing a modification of the surface formations of Fig. 1;

Fig. 9 is a plan view illustrating a further embodiment of the invention;

Fig. 10 is a cross sectional view of a pressed section of material embodying the features of Fig. 5;

Fig. 11 is a perspective view of a roll strip of material embodying the features illustrated in Figs. 3-5;

Fig. 12 is a sectional view through the material of Fig. 11 illustrating the ribbed formation on said strip;

Fig. 13 is a plan view of a further embodiment of the invention designed for use as brick siding;

Fig. 14 is a cross sectional view taken through 14—14 of Fig. 13; and

Fig. 15 is a plan view of a similar construction to that of Fig. 13 embodying a slight modification.

In carrying out my invention I preferably use a flexible composition base 2. This may be the usual felted material made from vegetable fibres, wool, asbestos or hair, alone, in combination, or including other materials and provided in the form of a continuous sheet or web which may in the following operations be at any time moving or stationary. The invention, however, contemplates the use of smaller sections of material, for example, the size of individual shingles or strips where such is found preferable. The base is preferably saturated with a suitable waterproofing substance, for instance, a low melting point asphalt and thereafter coated on one face and edges in the usual way with an additional plastic adhesive coating 4, as for instance, a high melting point bituminous material or one including resins of other character. Such material may also be applied to the opposite face where the following operations are to be made upon both faces or where desired a skin coat 6 may be provided. To the coating 4, on one or both sides of the base, before it has set is applied and partially embedded a suitable material 8 to form a roughened surface. This may be a coating of mineral particles, for instance, crushed brick, quartz, silica, pebbles, slate, coke, glass, asbestos rock, or granulated vitrified materials and natural sand. Crushed or powdered material such as talc or mica may also be applied to the layer 6 if preferred.

The size of the individual granular material employed may be those generally employed in the fabrication of roofing materials, and may comprise mixtures of several sizes, but for the purposes of this invention it is preferred that such granular material be of a small size, for instance, about a #26 mesh as material of this size may be cheaply procured and has advantages of coverage not always obtainable by the use of larger sized pieces.

In the embodiment shown in Figs. 1, 2, 3 and 4 the granular material may first be embedded in the normal roofing operations as by rolling or only spread over the adhesion layer. Thereafter while the coated base is still warm, I impart to the surface a plurality of formations, for example, corrugations providing raised portions 10, and valleys 12, by pressing, embossing or passing the material which may be a continuous moving web or an individual strip between a pair of rolls, one of which is provided with suitable complementary raised portions and valleys to be transmitted to the mineral surfaced plastic layer by pressing into such materials while the plastic layer is still warm. However, it is within the scope of this invention to provide such raised portions and valleys on a cold sheet by inducing flow of the bitumen layer through pressure only or through use of warm pressing elements. While any form of surface depressions and raised portions may be formed or impressed upon the material, I prefer and have clearly illustrated in Fig. 3, ridges and valleys in which the ridges are somewhat flat at the top, rounded at the corners and which are separated by deep and narrow valleys. I have found that ridges or ribs between ⅛ to ⅜ of an inch in width and valleys substantially 1/16 of an inch wide at the top form suitable formations for the product of my invention where a further coating or surfacing is to be applied to produce for example the effect shown in Fig. 1. Moreover, I prefer that in the forming operations the valleys be created by a roll comprising a gang of spaced apart circular discs of appropriate thickness and edge corner shape. The discs may be flat or may have their faces at the edge portions crimped or otherwise deformed. Also, I prefer that the discs be a free fit upon their arbor and free to move sidewise so that in the impressing operations irregular lines of depression may be created due to the edge formation of the discs and the weaving action thereof in movement across the sheet. The pressing roll and sheet will obviously be suitably backed by a hard surface or another roll. Furthermore, the valleys between discs may be such that the granular material upon the raised portion of the material may be untouched or pressed as desired. In the aforesaid operation the material of the normally coated sheet will be displaced to create the valleys and ribs or ridges and the granular material will be somewhat further embedded in the bottom of the valleys than elsewhere, the extent of embedding depending upon the amount of pressure and whether the impressing operation is performed immediately after the granular material is spread upon the plastic bituminous part of the base or whether such material has been initially imbedded as in the normal roofing operations. Where the asphalt coating is of sufficient thickness and the impressing operation is carefully carried out, the granules may remain somewhat above the asphalt layer. However, if the process is a hot one or operations are conducted upon a hot sheet, it is believed that a condition more like that illustrated in Fig. 4 will result; that is the granular material at the bottom of the variations will be substantially flush or even covered by the bituminous asphaltic material. Such may also be due to great pressure and in certain instances this result is preferred as it stresses the fibre of the base. While in the making of ordinary composition roofing material such might have serious consequence in exposure due to the deterioration and displacement of the formed ridges, I have found that a surface layer 14 of a rigidifying material, for example, a hydraulic cement, will not only completely seal in the bituminous layer and permit it to resist the undesirable actions of the weather heretofore encountered, but will also provide an encasing shell having high strength in compression that will to a considerable extent also prevent deformation of the formed ridges and valleys. In addition, such a coating provides considerable additional rigidity to the structure to prevent curling and blowing up in the wind and offers a surface that is highly resistant to fire brands and the like. Moreover, the rigidifying casing provided enables the roofer to tread upon this material in laying the same without fear of deforming the ridges of the material or bringing out the asphalt above the granules or causing the granules to slide. Also, the addition of such a coating makes the material more resistant to erosion, which feature is desirable as the channels or valleys form gutters for the conveyance of rain water. The cementitious material used may be compositions comprising for example ordinary portland cement, high early strength portland, white cement, natural cement, magnesium cement, for example, magnesium oxychloride, but preferably comprises a high alumina cement containing between 60–95 per cent of calcium aluminates or calcium alumina ferrites, particularly those made by fusion, and when properly so made entirely free of free lime. The above cements may also be provided with quick setting characteristics in order to aid in certain cases in their proper curing. The composition may also include extending materials such as marble dust, silica and mineral oxides or other coloring ingredients. In order to obtain a uniform coating over the formed base material and one that will withstand the continuous action of the weather, it is preferred that such material be impelled against the granular surface in the manner and by the means shown and described in my pending application Ser. No. 26,770, filed June 15, 1935.

Where desired, the surfaces, ridges and valleys may be created by an additional overlay of asphalt and granular material, which may be operated upon in the manner described above or the asphalt material may be deposited upon the sheet in the final form and fine granular material be impelled against this material, for example, as by an air blast to secure some anchorage thereof and thereafter the additional coating operation described above be carried out.

However, I have found that granular particles, particularly of the character heretofore used in roofing operations, do not secure a firm anchorage in the asphalt material unless firmly embedded, as the plastic asphalt alone does not provide good adhesive properties for such granules particularly where of a smooth surface variety. Furthermore, as previously set forth, the formation of ribs and the like on a mineral surfaced asphalt base produces weak or thin sections of asphalt which are often pierced by the granular layer. In order to produce an improved base structure, I have found it desirable and preferable in creating the article of my invention to form a structure such as that in Fig. 5. In doing so I initiate my operations with a fibre base that has received only a layer of plastic material, such as asphalt. Subsequently this asphalt is given impressions in the manner heretofore indicated while the asphalt is in a plastic state, although it is preferred that the operation be performed while the material may be pressure flowed. If the material is brittle, the bitumen may be somewhat annealed by passing the sheet through a hot water bath prior to carrying out the impressing operation. Subsequently the base with its formed asphaltic or other mastic layer is passed to a coating device for example one or more sprays or a device similar to that employed for my cement coating application and a coating or film 16 of a substantially liquid adhesive which will give greater bonding action and thereby improve the mechanical adhesion of superimposed granules is applied thereover. This binder is preferably a synthetic resin composition which may also be an oil composition and which has been reduced to the proper consistency by the addition of suitable thinners. However, stearine pitch or blends of such material with phenolic resins in order to improve the adhesive properties of the former material have also been found useful and are preferred from the standpoint of cost. Thereafter, granular particles, for example, sand or any of the materials mentioned above, preferably of a 26 mesh size, may be impelled against the liquid film and anchored therein. When the coating material has hardened, following evaporations of the solvent, the granules will be firmly held to the base. It is preferred when the coating does not include a bitumen, that the solvents employed be those which will not induce bleeding of the under asphalt layer. Furthermore, it is preferred that the binding coating comprises a phenolic resin, as such material forms a tough and flexible film which will resist any blistering action of the base materials and will in itself provide rigidifying characteristics to resist flow of the under asphaltic formations. Where the aforesaid granule anchoring coating is used, it is believed that the structure without further treatment provides a useful product for weather exposures having improved properties over the structures of the prior art. In instances of such use, the granules may be of any suitable character and color and it is to be noted that the use of a liquid adhesive material considerably aids in wetting the granule and giving it the additional bonding action required to improve its anchorage. However, it is preferred that a base formed in this manner likewise receive the wear resistant cementitious coating described above and in a similar manner.

In certain instances it may be desirable to provide surface formations upon both sides of the sheet and in those cases the base may be prepared on both sides and the operations hereinbefore described for a single side be carried out individually but preferably simultaneously, at least insofar as the impressing operations are concerned. Fig. 6 shows such an embodiment wherein the raised portions on opposite sides of the base are staggered. They may, however, be in line where upper ribs cannot be properly backed up in the impressing operations.

In Fig. 1 it will be noted that the ridges and valleys are of considerable length. In this manner a continuous cementitious section is provided for the product having a much greater section modulus than a coating layer of similar thickness on a flat sheet and therefor provides increased rigidity. Not only does this formed surface provide a pleasing visual effect but the same creates thickened edge portions with resultant greater edge shadow effects which are obviously enhanced by the shadows created upon the surface. The rib may have a length the full dimension of a sheet as in Fig. 11 or may be shorter as shown in Fig. 1. In the element of Fig. 7, the features described above have been applied to the tabs of a serrated strip. It will be noted that the surface embodiments are confined to the depth of the tabs and in certain tabs the ridges and valleys run in one direction, for example, in the direction of length of the strip, and in others in a different direction, for instance, in the direction of the depth of the strip. In this manner the tabs are given distinctive effects and in an assembly with the tabs of adjacent overlying strips staggered with respect to those of an underlying strip and spaced from the upper margin of the surface formations brick-like effects separated by apparent mortar sections may be created. While the upper portion of this strip has not been embossed or otherwise formed the resin bonding coating and/or cementitious top coatings described above may also be applied to this portion of the strip. Moreover, where desired, the surface embossment may extend beyond the upper extremities of the tabs.

In Fig. 8 an element is illustrated in which the ridges created are arranged in columns as a series and with the ridges of adjacent columns in staggered relation. Such a structure produces a desirable tread material and likewise makes an artistic result. This structure further has the advantage that it produces a weakened section permitting flexing of the material, in certain constructions, along a staggered line passing through the valleys from one side to the other. The structure of Fig. 9 likewise possesses similar characteristics and produces different visual effects.

In Fig. 10 is illustrated an element whose section has been shaped to create the surface ridges and valleys. This structure also embodies the adhesive coating feature of Fig. 5.

In certain instances it may be desirable to roll the material for example, to create roll roofing and in order to avoid stretch or weakening of the asphalt layer in the valleys which would result from the material being rolled with the corrugations or surface embossments upon the outer face of the convolutions and sticking when rolled either way, I have found that a structure as hereinbefore described employing a synthetic resin coating for the grit is much preferred as such material may be rolled either way without serious consequences for the bonding film provided has sufficient flexibility and toughness to stand the rolling action without checking. Furthermore, in the structures provided with a cementitious coating the material may be rolled as shown in Fig. 11, when desired, without injuring the under asphalt layer where such is the only granule adhesive provided.

In order to permit a considerable amount of curvature of the material I prefer to form the ribs of Fig. 11, in the manner disclosed in Fig. 12. It will be noted that the ribs are steeply inclined from the peaks thereof and in effect form a triangular section. This permits movement of the adjacent ribs in rolling through a greater angular distance and greater curvature is thus made possible.

In Figs. 13–15 I have illustrated a further structure from which beneficial results may be obtained. It has particular advantages as a brick-siding or other figure simulating constructions in that it completely avoids the use of edge slots which weakene a roofing strip and in flexible material permit blowing up and curling of such sections. Furthermore, this structure permits the coverage of greater areas with a minimum of material. The structure comprises a base formed in any of the ways previously described with the surface embossed to produce raised figures, for example, in Fig. 13 brick-like figures 18 separated by narrow valleys 20 to simulate mortar between bricks are shown. In order to emphasize the mortar simulating condition the cementitious material or other coating material is spread over the formed base and is permitted to flow and substantially fill the valleys between configurations. Before it has set or dried the material is removed by suitable means such as wiping, from the peak portions of the granular particles upon the surface of the raised bricks. Thereafter the mortar creating material is permitted to set and/or harden or dry and a novel contrasting effect will result. Where a hydraulic cement is employed for this purpose, it will be noted that the filled valleys will produce a highly rigid structure. It is preferred that the valleys extend into the upper regions of the base in order that such rigidity may extend to the covered portions in assembly. It will be seen that the element of Fig. 13 may be laid with either edge to the weather in one case, creating full brick effects and in the other, a combination of full and half brick effects. Furthermore, if desired, only a sufficient amount of material need be allowed above the horizontal mortar stripe to provide for overlapping in assembly. In this structure it is also contemplated that the edges may be suitably chamfered or suitably formed to create lap joints between adjacent elements in a course or between courses.

A further feature of the formed structures of ridges and valleys described above particularly where a cement surfacing is provided resides in its ability to substantially conceal surface cracks, in the cement or other layers. Such results in careless handling, in certain expansion and contraction conditions and in instances where a flat shingle is used for re-roofing and must be conformed to an uneven surface. Where such may occur it is preferable that the ribs extend in the direction of bend or an arrangement of ribs such as shown in Figs. 8 and 9 be used. As the valleys are the thinnest points in the structure bending will naturally occur at these locations and if the bending be one to place the cement in tension, hair cracks may appear but will be concealed by the adjacent ribs. Moreover, the understructure will fully protect the product. Also, where as previously described, the ribs and valleys have been formed with considerable pressure in the valleys, the fibre section is somewhat stretched and deformed and the asphalt layer is thinnest. Generally, therefore, expansion of the bitumen will be confined to sections the width of the ribs and any expansion in the valleys will be extremely slight. Expansion in both cases will be resisted by the cement layer even if only a light weight coating. However, where the base materials are not carefully selected, hair cracks due to expansion may occur and such likewise will be concealed as in the case of bending.

Another feature resides in the surface cooling of the material obtained in warm climates by the ribs acting as fins for catching air currents sweeping a building surface. The ribs likewise retarded ice slides in winter.

From the foregoing it will be seen that I have produced a novel and improved covering material and have presented novel processes for its fabrication. It will be obvious that various modifications may be made in the material selected and constructions formed; also in the processes of using and producing them, without departing from the spirit of my invention which I desire to construe as broadly as the following claims taken in conjunction with the prior art may allow. The term, roofing, and similar expressions, as used in the claims and specifications are employed in a generic sense and are also intended to cover such applications as for walls, floors and the like. The details that have been given are for the purpose of illustration, not restriction.

I claim:

1. Surface covering material comprising a base including a waterproofing surface coating, said surface coating having secured thereto particles of surface roughening material and said coating presenting a pattern comprising a plurality of raised portions separated by intervening furrows; a cementitious layer comprising hydraulic cement over said raised portions and furrows and anchored by said particles of surface roughening material, said cementitious layer maintaining visually prominent said raised portions and furrows and providing a rigidifying encasement on said raised portions capable of resisting substantial pressure and adapted to substantially prevent deformation thereof and substantially protect the underlying waterproofing coating, and said pattern substantially limiting the cracking effects upon said cementitious layer of expansion and contraction of said base material, and adapted to substantially hide from view surface cracking of the cementitious layer due to said effects and to handling, by substantially confining said cracking to said furrows.

2. Surface covering material comprising a fibrous base including a thermoplastic coating having secured thereto particles of surface roughening material, and said thermoplastic coating presenting a plurality of narrow raised portions separated by narrow furrows, a hardened cementitious layer comprising hydraulic cement over said raised portions and furrows and anchored by said particles of surface roughening material, said cementitious layer maintaining visually prominent said raised portions and furrows and providing a rigidifying encasement on said raised portions capable of resisting substantial pressure and adapted to substantially prevent deformation thereof and substantially protect the underlying thermoplastic composition, and said raised portions and furrows substantially limiting the cracking effects upon said cementitious layer of expansion and contraction of said thermoplastic composition and adapted to substantially hide from view surface cracking of the cementitious layer due to said effects and to handling, by substantially confining said cracking to said furrows.

3. Surface covering material comprising a fibrous base, a layer of bituminous material upon said base having mineral particles at its surface, said bitumen layer presenting a plurality of raised portions separated by intervening furrows, a cementitious layer comprising the hardened product of an aluminate cement, over said raised portions and furrows and anchored by said mineral particles, said cementitious layer maintaining visually prominent, said raised portions and furrows and providing a rigidifying encasement on said raised portions capable of resisting substantial pressure and adapted to substantially prevent deformation thereof, and said cementitious layer substantially protecting the underlying bitumen and providing a surface of high erosion resisting properites in said furrows, and said raised portions and furrows substantially limiting the cracking effects upon said cementitious layer of expansion and contraction of said bitumen and adapted to substantially hide from view surface cracking of the cementitious layer due to said effects and handling, by substantially confining said cracking to said furrows.

4. Surface covering material comprising a base, a layer of bituminous material on said base, said bituminous layer presenting a plurality of raised portions and furrows, a substantially uniform coating of substantially water-insoluble adhesive over said bitumen in said raised portions and furrows, and maintaining visually prominent said raised portions and furrows, granular particles anchored by said adhesive but not embedded in said bitumen, said particles projecting substantially uniformly above the surface of said adhesive on said raised portions and furrows, and a hardened cementitious coating comprising hydraulic cement over said raised portions and depressions and anchored by said granular particles, said cementitious coating maintaining visually prominent said raised portions and furrows and providing a rigidifying encasement on said raised portions capable of resisting substantial pressure and adapted to substantially prevent deformation thereof, and said raised portions and furrows substantially limiting the cracking effects upon said cementitious layer of expansion and contraction of said bitumen and adapted to substantially hide from view surface cracking of the cementitious layer due to said effects and handling, by substantially confining said cracking to said furrows.

5. Surface covering material comprising a pliable base having a thermoplastic layer thereon including particles of surface roughening material and presenting a continuous surface of closely related narrow raised portions of substantially triangular cross-section separated by furrows of substantially similar shape and a hardened cementitious layer comprising hydraulic cement over said raised portions and furrows, said cement layer maintaining visually prominent said raised portions and valleys, and providing a rigidifying encasement on said raised portions adapted to substantially prevent deformation thereof and said furrows providing lines of weakness along which said surface covering material may be sufficiently flexed to be wound into a roll with its cementitious coating on the inner face of the rolled material.

6. Surface covering material comprising a base, a layer of thermoplastic material on said base, particles of surface roughening material secured by said material, an overlay of further thermoplastic material over said first layer and particles of surface roughening material secured by said overlay material, said overlay of thermoplastic material presenting on said base a pattern comprising raised portions separated by intervening furrows, a hardened cementitious layer comprising hydraulic cement, over said raised portions and furrows, and anchored by said particles of surface roughening material, said cementitious layer maintaining visually prominent said raised portions and furrows and providing a rigidifying encasement on said raised portions capable of resisting substantial pressure and adapted to substantially prevent deformation thereof and substantially protect the underlying thermoplastic material, and said pattern substantially limiting the cracking effects upon said cementitious layer of expansion and contraction of said thermoplastic material, and adapted to substantially hide from view surface cracking of the cementitious layer due to said effects and to handling, by substantially confining said cracking to said furrows.

7. A method of making surface covering material, which comprises treating a base with a waterproofing composition, applying to said base an overlay of thermoplastic material, and arranging said overlay material in a manner to present a surface of raised portions separated by furrows, facing the surface of said raised portions and furrows with a substantially uniform layer of adhesive coating and applying said coating to maintain the visual prominence of said raised portions and furrows, applying a surfacing of granualr particles over said adhesive coating on said raised portions and furrows, anchoring said granules thereto without embedding said particles in said overlay plastic and so that said granules project substantially uniformly from said adhesive over the surface of said raised portions and furrows, and applying a cementitious coating comprising hydraulic cement over said raised portions and furrows, and in a manner to substantially maintain the visual prominence of said raised portions and furrows.

8. Surface covering material comprising a fibrous base including a thermoplastic coating having secured thereto particles of surface roughening material and said thermoplastic coating presenting a plurality of narrow raised portions separated by narrow furrows, the said raised portions and furrows being arranged in spaced apart groups to present brick-like configurations; a hardened cementitious layer comprising hydraulic cement over said raised portions and furrows and anchored by said particles of surface roughening material, said cementitious layer following the surface contour of said raised portions and furrows and without filling said furrows and maintaining visually prominent said raised portions and furrows and providing a rigidifying encasement on said raised portions capable of resisting substantial pressure and adapted to substantially prevent deformation thereof and substantially protect the underlying thermoplastic composition, and said raised portions and furrows substantially limiting the cracking effects upon said cementitious layer of expansion and contraction of said thermoplastic composition and adapted to substantially hide from view surface cracking of the cementitious layer due to said effects and to handling, by substantially confining said cracking to said furrows.

9. Surface covering material comprising a fibrous base, a layer of bituminous material upon said base having mineral particles at its surface, said bitumen layer presenting a plurality of raised portions separated by intervening furrows, a cementitious layer comprising the hardened product of a cement composition comprising a high aluminate cement containing between 60 to 95% of calcium aluminates or calcium alumina ferrites, over said raised portions and furrows and anchored by said mineral particles, said cementitious layer maintaining visually prominent said raised portions and furrows and providing a rigidifying encasement on said raised portions capable of resisting substantial pressure and adapted to substantially prevent deformation thereof, and said cementitious layer substantially protecting the underlying bitumen and providing a surface of high erosion resisting properties in said furrows, and said raised portions and furrows substantially limiting the cracking effects upon said cementitious layer of expansion and contraction of said bitumen and adapted to substantially hide from view surface cracking of the cementitious layer due to said effects and handling, by substantially confining said cracking to said furrows.

10. Surface covering material comprising a base, a layer of bituminous material on said base, said bituminous layer presenting a plurality of raised portions and furrows, a substantially uniform coating of substantially water-insoluble synthetic resin adhesive over said bitumen in said raised portions and furrows, and maintaining visually prominent said raised portions and furrows, granular particles anchored by said adhesive but not embedded in said bitumen, said particles projecting substantially uniformly above the surface of said adhesive on said raised portions and furrows, and a hardened cementitious coating comprising hydraulic cement over said raised portions and depressions and anchored by said granular particles, said cementitious coating maintaining visually prominent said raised portions and furrows and providing a rigidifying encasement on said raised portions capable of resisting substantial pressure and adapted to substantially prevent deformation thereof, and said raised portions and furrows substantially limiting the cracking effects upon said cementitious layer of expansion and contraction of said bitumen and adapted to substantially hide from view surface cracking of the cementitious layer due to said effects and handling, by substantially confining said cracking to said furrows.

11. A method of making surface covering material, which comprises treating a base with a waterproofing composition, applying to said base an overlay of thermoplastic material, and arranging said overlay material in a manner to present a surface of raised portions separated by furrows, facing the surface of said raised portions and furrows with a substantially uniform layer of liquid resin adhesive coating and applying said coating to maintain the visual prominence of said raised portions and furrows, applying a surfacing of granular particles over said adhesive coating on said raised portions and furrows, anchoring said granules thereto without embedding said particles in said overlay plastic and so that said granules project substantially uniformly from said adhesive over the surface of said raised portions and furrows, and applying a cementitious coating comprising hydraulic cement over said raised portions and furrows, and in a manner to substantially maintain the visual prominence of said raised portions and furrows.

NORMAN P. HARSHBERGER.